United States Patent
Ahmed (10) Patent No.: US 7,673,102 B2
(45) Date of Patent: Mar. 2, 2010

(54) METHOD AND SYSTEM FOR MAXIMUM RESIDENCY REPLACEMENT OF CACHE MEMORY

(75) Inventor: Muhammad Ahmed, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 11/437,501

(22) Filed: May 17, 2006

(65) Prior Publication Data

US 2007/0271416 A1 Nov. 22, 2007

(51) Int. Cl.
G06F 12/00 (2006.01)
(52) U.S. Cl. .................. 711/128; 711/133; 711/136
(58) Field of Classification Search .......... 711/128, 711/133, 136, 159, 160
See application file for complete search history.

(56) References Cited

U.S. PATENT DOCUMENTS

| | | | |
|---|---|---|---|
| 4,901,307 | A | 2/1990 | Gilhousen et al. |
| 5,103,459 | A | 4/1992 | Gilhousen et al. |
| 5,590,379 | A | 12/1996 | Hassler et al. |
| 6,694,408 | B1 * | 2/2004 | Villagomez et al. ......... 711/133 |
| 7,237,067 | B2 * | 6/2007 | Steely, Jr. ................. 711/133 |
| 2002/0010839 | A1 * | 1/2002 | Tirumala et al. ........... 711/133 |
| 2002/0188807 | A1 | 12/2002 | Chaudhry |
| 2004/0153611 | A1 | 8/2004 | Jamil |

FOREIGN PATENT DOCUMENTS

GB 2009982 6/1979

OTHER PUBLICATIONS

Hennessy, J.L. et al: "Computer Architecture. A quantitative approach, passage" Computer Architecture: A Quantitative Approach, XP=02318184, Jun. 2002.
International Search Report-PCT/US2007/069188, International Search Authority European Patent Office, Dec. 28, 2007.

* cited by examiner

Primary Examiner—Jack A Lane
(74) Attorney, Agent, or Firm—Nicholas J. Pauley; Sam Talpalatsky; Peter M. Kamarchik (57) ABSTRACT

Techniques for use in CDMA-based products and services, including replacing cache memory allocation so as to maximize residency of a plurality of set ways following a tag-miss allocation. Herein, steps forming a first-in, first-out (FIFO) replacement listing of victim ways for the cache memory, wherein the depth of the FIFO replacement listing approximately equals the number of ways in the cache set. The method and system place a victim way on the FIFO replacement listing only in the event that a tag-miss results in a tag-miss allocation, the victim way is placed at the tail of the FIFO replacement listing after any previously selected victim way. Use of a victim way on the FIFO replacement listing is prevented in the event of an incomplete prior allocation of the victim way by, for example, stalling a reuse request until such initial allocation of the victim way completes or replaying a reuse request until such initial allocation of the victim way completes.

29 Claims, 4 Drawing Sheets

METHOD AND SYSTEM FOR MAXIMUM RESIDENCY REPLACEMENT OF CACHE MEMORY

FIELD

The disclosed subject matter relates to digital signal processing in support of communications products and services. More particularly, this disclosure relates to a novel and improved method and system for maximum residency replacement of cache memory as may find use in a digital signal processor for a handset or other communications system.

DESCRIPTION OF THE RELATED ART

Increasingly, electronic equipment and supporting software applications involve digital signal processing. Home theatre, computer graphics, medical imaging and telecommunications all rely on signal-processing technology. Digital signal processing requires fast math in complex, but repetitive algorithms. Many applications require computations in real-time, i.e., the signal is a continuous function of time, which must be sampled and converted to binary, for numerical processing. The processor must thus execute algorithms performing discrete computations on the samples as they arrive. The architecture of a digital signal processor, or DSP, is optimized to handle such algorithms. The characteristics of a good signal processing engine include fast, flexible arithmetic computation units, unconstrained data flow to and from the computation units, extended precision and dynamic range in the computation units, efficient program sequencing, and ease of programming.

One promising application of DSP technology includes communications systems such as a code division multiple access (CDMA) system that supports voice and data communication between users over a satellite or terrestrial link. The use of CDMA processes in a multiple access communication system is disclosed in U.S. Pat. No. 4,901,307, entitled 'SPREAD SPECTRUM MULTIPLE ACCESS COMMUNICATION SYSTEM USING SATELLITE OR TERRESTRIAL REPEATERS," and U.S. Pat. No. 5,103,459, entitled 'SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more telecommunications, and now streaming video, standards. One such first generation standard is the "TIA/EIA/IS-95 Terminal-Base Station Compatibility Standard for Dual-mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3rd Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard. There are also video compression standards, such as MPEG-1, MPEG-2, MPEG-4, H.264, and WMV (Windows Media Video), as well as many others that such wireless handsets will increasingly employ.

Digital signal processors (DSPs) may find valuable use in wireless handsets complying with the above standards. In particular, wireless handsets are requiring and increasingly will require that the DSP execute instructions from user-orientation, scientific, and multimedia applications, as well as many other types of applications. The processor resource requirements may vary widely and dynamically for applications such as television broadcasts, streaming message tickers, electronic mail (including messages with attached documents), as well as resident applications, such as streaming video (e.g., videoconferencing), photography, and document (word processing, spreadsheets, presentation, etc.) applications, all from the same DSP.

In the operation of a DSP, lower power consumption is of growing importance in data processing systems, due, for example, to wide spread use of such portable and handheld applications. Many DSPs today use a smaller, faster, and more efficient memory, sometimes referred to as a cache, to reduce the number of accesses to main memory. Accesses to cache memory generally consume less power and result in reduced latencies as compared to accesses to other internal or external memories. By storing those items which will subsequently be requested again in the faster, more efficient cache, significant power reductions and performance increase may occur.

Cache memory also provides the processor with a way to fetch data quickly without incurring the wait-states associated with main memory sources, such as DRAM. Using cache memory typically improves computer system performance, making commonly-used data available to the processor without requiring paging cycles or the physical delays occurring from main memory's us of complex bus structures.

Typically, cache memory is organized in "sets" or "ways" (hereafter collectively referred to as "ways"). A cache memory way typically includes of a number of cache memory entry locations that may be accessed using a common address. A set-associative cache is a type of cache memory that organizes data in cache ways that are assigned, or "mapped," to a particular location within a main memory sources, such as DRAM. A cache memory way is re-mapped when data stored within that way is replaced by data from another location within main memory. Furthermore, cache ways may be mapped to the same main memory location in order to help maintain in cache the most current version of data associated with a particular main memory location.

Now, cache memory is typically smaller than main memory, so cache ways need to be deleted to make room for newly accessed data which is not stored in the cache. Those cache ways to be replaced are known as "victim ways." Data applied to the victim ways should be statistically more likely to be accessed again in the near future than is data that has been in the cache for some time. Typically, the cache selects one or more cache entries which are eligible to store data corresponding to a given transaction, and searches these entries to detect a hit or miss. In a set associative cache, two or more entries are eligible to store the data based on the address of the data. The cache line of any one of the two or more entries could be evicted on a miss. Set associative caches employ a replacement policy to select one of the two or more eligible entries for eviction. A variety of replacement policies exist.

Two known types of cache replacement processes are the Last Recently Used ("LRU") and Not Recently Used ("NRU") cache replacement policies. Each of these cache replacement policies require complex monitoring of the transactions presented to the cache, along with detailed knowledge of the implemented replacement policy to determine the state of the replacement policy at any given point in time. Thus, for each use of the cache way, there is the need to update the storage bit associated with the cache way. This updating is expensive in terms of operational resource use and energy consumption.

Accordingly, there is a need for a low cost, highly efficient cache replacement process that achieves essentially the same performance of the NRU and LRU approaches. Low cost benefits include reducing the storage requirements in the cache replacement process. Also, reducing storage requirements promotes improved energy use during DSP operation.

Another consideration in use of the LRU and NRU processes is of particular relevance in a DSP performing multi-threaded processing. In such a processor, with the LRU and NRU cache replacement policies, there is the recurring need to forward storage bit information from one pipeline to the next. The costs of forwarding the storage bit information from pipeline to pipeline can be excessive, particularly when there is a limited time budget for each pipeline stage. That is, the handling of the storage bit information from one pipeline stage to another may exact an undesirable cost during the multi-threaded operation.

Also, as mentioned above, the handling of storage bits, as is required in the LRU and NRU replacement policies, generally entails the use of wide and large busses to convey storage bit information. Because the large busses that convey the storage bit information consume power and introduce performance delays, there is the desire to reduce or eliminate the conveyance of such storage bit information in a cache way replacement policy.

Accordingly, a need exists to improve over the known LRU and NRU cache replacement policies. Particularly, such a need exists in the operation of a multi-threaded DSP or similar processor.

A further need exists to reduce the power consumption and performance delays that exist in known cache replacement processes for a DSP or similar processor.

In essence, therefore, a need exists to eliminate the handling of storage bit information during cache way replacement operations of a DSP or similar processor.

SUMMARY

Techniques here disclosed provide for maximum residency replacement of cache memory in a digital signal processor, which techniques improve both the operation of the processor and the efficient and more rapid processing of digital signal processor instructions. The present disclosure may, for example, benefit a multi-threaded processor system in which a plurality of processor threads share cache memory in an n-way set associative method (where, n is 2 or larger), and more particularly to a replacement control technology that is applicable when a miss-hit occurs. Use of the disclosed subject matter permits increasingly robust software applications for personal computers, personal digital assistants, wireless handsets, and similar electronic devices, as well as increasing the processor speed and service quality.

According to one aspect of the disclosed subject matter, there is provided a method and a system for replacing cache memory allocation so as to maximize residency of a plurality of set ways following a tag-miss allocation. The disclosure includes forming a first-in, first-out (FIFO) replacement listing of victim ways for the cache memory, wherein the depth of the FIFO replacement listing approximately equals the number of ways in the cache set. The method and system place a victim way on the FIFO replacement listing only in the event that a tag-miss results in a tag-miss allocation, the victim way is placed at the tail of the FIFO replacement listing after any previously selected victim way. Use of a victim way on the FIFO replacement listing is prevented in the event of an incomplete prior allocation of the victim way by, for example, stalling a reuse request until such initial allocation of the victim way completes or replaying a reuse request until such initial allocation of the victim way completes.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

DETAILED DESCRIPTION OF THE SPECIFIC EMBODIMENTS

The disclosed subject matter of a method and system for maximum residency replacement of cache memory as here presented has use in a very wide variety of digital signal processing applications, including those involving multi-threaded processing. One such application appears in telecommunications and, in particular, in wireless handsets that employ one or more DSP circuits. Consequently, the following FIGUREs describe a telecommunications DSP within which one may use the present teachings. Remember, however, that the implementation here described provides but one of a virtually limitless set of applications to which the disclosed subject matter may apply.

Figure 1:
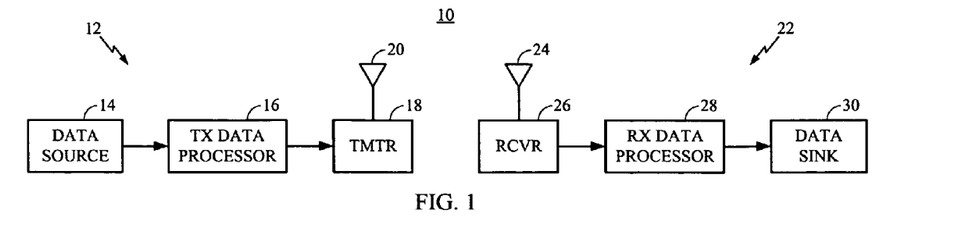
FIG. 1 is a simplified block diagram of a communications system that can implement the present embodiment.

For the purpose of explaining how such a wireless handset may be used, FIG. 1 provides a simplified block diagram of communications system 10 that may implement the presented embodiments of the disclosed data processing method and system. At transmitter unit 12, data is sent, typically in blocks, from data source 14 to transmit (TX) data processor 16 that formats, codes, and processes the data to generate one or more analog signals. The analog signals are then provided to transmitter (TMTR) 18 that modulates, filters, amplifies, and up converts the baseband signals to generate a modulated signal. The modulated signal is then transmitted via antenna 20 to one or more receiver units.

At receiver unit 22, the transmitted signal is received by antenna 24 and provided to receiver (RCVR) 26. Within receiver 26, the received signal is amplified, filtered, down converted, demodulated, and digitized to generate in phase (I) and (Q) samples. The samples are then decoded and processed by receive (RX) data processor 28 to recover the transmitted data. The decoding and processing at receiver unit 22 are performed in a manner complementary to the coding and processing performed at transmitter unit 12. The recovered data is then provided to data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
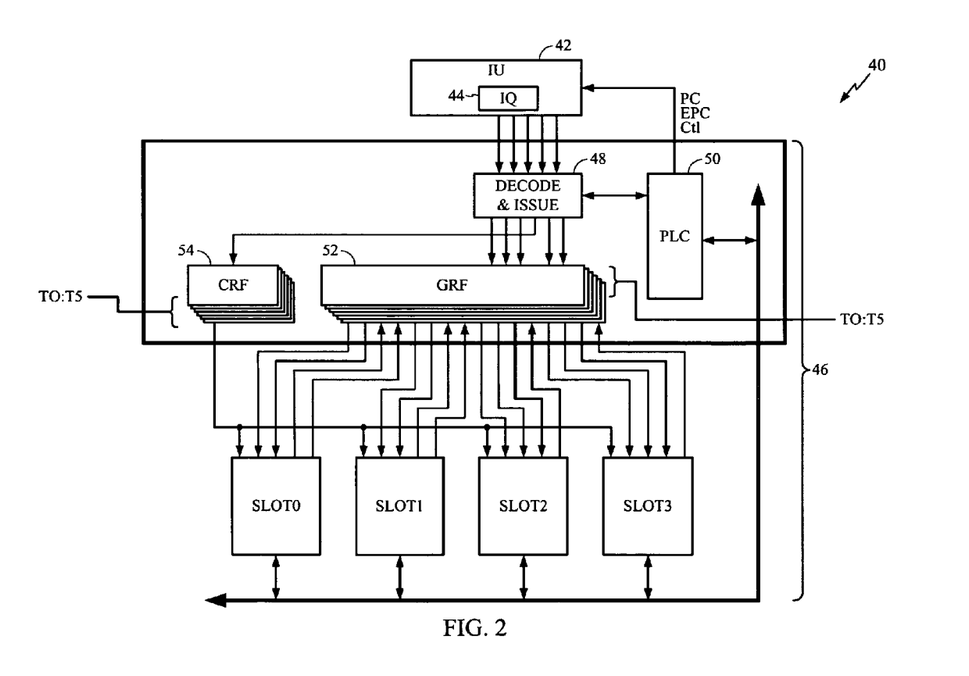
FIG. 2 illustrates a DSP architecture for carrying forth the teachings of the present embodiment.

FIG. 2 illustrates DSP 40 architecture that may serve as transmit data processor 16 and receive data processor 28 of FIG. 1. Once more, emphasis is made that DSP 40 architecture only represents one embodiment among a great many of possible digital signal processor embodiments that may effectively use the teachings and concepts here presented. DSP 40 represents a multi-threaded processor wherein threads T0:T5 contain sets of instructions. Instructions are queued through instruction unit (IU) 42 into instruction queue (IQ) 44. Instructions in IQ 44 are ready to be issued into processor pipeline 46. From instruction queue 44, a single thread, e.g., thread T0, may be selected by decode & issue logic circuit 48.

IQ 44 in IU 42 keeps a sliding buffer of the instruction stream. Each of the six threads T0:T5 that DSP 40 supports has a separate IQ 44, where each entry may store one VLIW packet or up to four individual instructions. Decode and issue circuitry 48 logic is shared by all threads for decoding and issuing a VLIW packet or up to two superscalar instructions at a time, as well as for generating control buses and operands for each pipeline SLOT0:SLOT3. PLC 50 is also shared by all threads for resolving exceptions and detecting pipeline stall conditions such as thread enable/disable, replay conditions, maintains program flow etc.

In operation, general register file (GRF) 52 and control register file (CRF) 54 of a selected thread is read, and read data is sent to execution data paths for SLOT0:SLOT3. SLOT0:SLOT3, in this example, provide for the packet grouping combination employed in the present embodiment. Output from SLOT0:SLOT3 returns the results from the operations of DSP 40.

The subject matter here disclosed deals with the cache replacement policy of a single thread. A single thread sees a complete uni-processor DSP 40 with all registers and instructions available. Through coherent shared memory facilities, this thread is able to communicate and synchronize with other threads. Whether these other threads are running on the same processor or another processor is largely transparent to user-level software.

Figure 3:
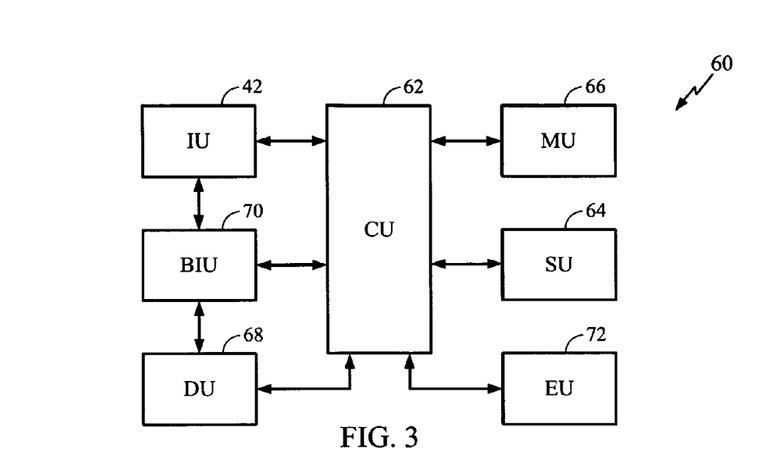
FIG. 3 shows a block diagram of a control unit (CU) as may be operated in a system employing the teachings of the present disclosure.

Turning to FIG. 3, the present micro-architecture 60 for DSP 40 includes control unit (CU) 62, which performs many of the control functions for processor pipeline 46. CU 62 schedules threads and requests mixed 16-bit and 32-bit instructions from IU 42. CU 62, furthermore, schedules and issues instructions to three execution units, shift-type unit (SU) 64, multiply-type unit (MU) 66, and load/store unit (DU) 68. CU 62 also performs superscalar dependency checks. Bus interface unit (BIU) 70 interfaces IU 42 and DU 68 to a system bus (not shown).

SLOT0 and SLOT1 pipelines are in DU 68, SLOT2 is in MU 66, and SLOT3 is in SU 64. CU 62 provides source operands and control buses to pipelines SLOT0:SLOT3 and handles GRF 52 and CRF 54 file updates. CU 62 accepts external inputs such as interrupts and reset, and supports emulation unit (EU) 72. CU 62 also handles exceptions due to protection violations occurring during address translations. Mixed 16- and 32-bit instructions can be issued in parallel, up to four at a time, in one embodiment of micro-architecture 60. However, many different variations of 16-bit, 32-bit, and other length instructions may be implemented in other embodiment, all within the scope of the disclosed subject matter. Micro-architecture 60, furthermore, may also support moving two 64-bit double words from CU 62 for each cycle.

DSP 40, using micro-architecture 60, specifically supports the following classes of applications: (1) communications signal-processing (e.g., modems); (2) video processing (e.g., H.264 format); (3) image processing; (4) audio processing; (5) 3-D graphics front-end software; and (6) supporting control code, protocol stacks, RTOS, etc. As such, DSP 40 issues both VLIW instruction packets, as well as individual superscalar issue instructions. Issue width for individual instructions can range from one instruction per issue slot to maximum VLIW packet. As an example, DSP 40 may issue as many as four instructions in a VLIW packet per issue slot. Also, DSP 40 may issue one or two instructions using superscalar issue.

Figure 4:
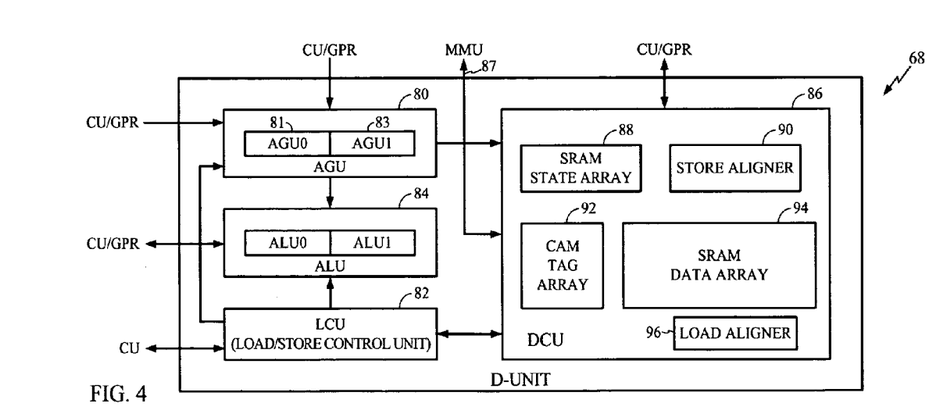
FIG. 4 presents a block diagram of a data unit (DU) as an exemplary circuit that may employ the cache way replacement process of the present disclosure.

FIG. 4 presents a representative data unit, DU 68, block partitioning wherein may apply the disclosed subject matter. DU 68 includes an address generating unit, AGU 80, which further includes AGU0 81 and AGU1 83 for receiving input from CU 62. The subject matter here disclosed has principal application with the operation of DU 68. Load/store control unit, LCU 82, also communicates with CU 62 and provides control signals to AGU 80 and ALU 84, as well as communicates with data cache unit, DCU 86. ALU 84 also receives input from AGU 80 and CU 62. Output from AGU 80 goes to DCU 86. DCU 86 communicates with memory management unit ("MMU") 87 and CU 62. ALU 84 includes ALU0 85 and ALU1 89, one for each slot and contains the data path to perform arithmetic/transfer/compare (ATC) operations within DU 68.

DCU 86 includes SRAM state array circuit 88, store aligner circuit 90, CAM tag array 92, SRAM data array 94, and load aligner circuit 96. To further explain the operation of DU 68, wherein the claimed subject matter may operate, reference is now made to the basic functions performed therein according to the several partitions of the following description. In particular, DU 68 executes load-type, store-type, and 32-bit instructions from ALU 84.

DU 68 receives up to two decoded instructions per cycle from CU 60 in the DE pipeline stage including immediate operands. In the RF pipeline stage, DU 68 receives general purpose register (GPR) and/or control register (CR) source operands from the appropriate thread specific registers. The GPR operand is received from the GPR register file in CU 60. In the EX1 pipeline stage, DU 68 generates the effective address (EA) of a load or store memory instruction. The EA is presented to MMU 87, which performs the virtual to physical address translation and page level permissions checking and provides page level attributes. For accesses to cacheable locations, DU 68 looks up the data cache tag in the EX2 pipeline stage with the physical address. If the access hits, DU 68 performs the data array access in the EX3 pipeline stage.

For cacheable loads, the data read out of the cache is aligned by the appropriate access size, zero/sign extended as specified and driven to CU 60 in the WB pipeline stage to be written into the instruction specified GPR. For cacheable stores, the data to be stored is read out of the thread specific register in the CU 60.

DU 68 also executes cache instructions for managing DCU 86. The instructions allow specific cache lines to be locked and unlocked, invalidated, and allocated to a GPR specified cache line. There is also an instruction to globally invalidate the cache. These instructions are pipelined similar to the load and store instructions. For loads and stores to cacheable locations that miss the data cache, and for uncacheable accesses, DU 68 presents requests to BIU 70. Uncacheable loads present a read request. Store hits, misses and uncacheable stores present a read/write request. DU 68 tracks outstanding read and line fill requests to BIU 70. DU 68 also allows accesses by other threads while one or more threads are blocked, pending completion of outstanding load requests. That is, DU 68 supports read/write requests both to and from the DSP 40 core processor. BIU 70, therefore, provides a bi-directional interface to the bus for these operations.

There are two types of stores. First, there are stores that store directly into the cache, that is, a "write back" store. Also, there are stores that may store in the cache, but they also sent the transaction to the bus. The "write-through" and "uncached" stores, both send a data to the bus, as well as to the cache. A store hit will present a read/write request for the write-through store. In the event of a store miss in the event of a write-back store, appearing on the bus will be read request. If the request is a write through, then the data goes directly to the bus and is not written to the cache.

The disclosed subject matter provides a "first-in, first-out" or "FIFO" listing process for cache replacement operations during digital signal processing, such as those occurring in DU 68. In analyzing the effectiveness of the presently disclosed FIFO cache replacement process, more efficient and less cumbersome cache replacement process exists. This is true despite there being no process to transfer and track the location of the storage bits.

A technical advantage of the disclosed process is the avoidance of the need to track which cache line has been most recently used. The present process imposes no such requirement. With the present FIFO cache replacement process, there is only the need to determine the presence of available cache resources. There is no requirement to know maintain a running record of the access paths to cache memory. So, with each cache load, when using NRU or LRU processes, there is a calculation that must occur to determine the cache way to employ.

The disclosed subject matter updates the cache way in the event that a miss occurs. Thus, when many misses occur the process of the disclosed subject matter will operate continually to identify the cache way to use in the event of a the next store request. On the other hand, if cache misses do not occur, then the process here disclosed does not continuously update, as would use of the LRU or NRU processes. Instead, the present FIFO cache replacement process waits until a next cache miss occurs. That is, the NRU and LRU processes track the cache hits that occur, whereas the FIFO cache replacement process here disclosed track the cache misses that occur.

With the disclosed subject matter, only when a miss occurs will there be a cache way to use. The FIFO cache replacement process bases the next cache way to replace according to the cache ways that have been replaced from the list at the point when a cache is to be replaced. Accordingly, if no way is being replaced, the FIFO listing of cache ways to replace will not change. When a miss occurs, the oldest missed cache is least value to the replacement process, as it was replaced earliest in time. Therefore, the older is the way on the FIFO replacement list the higher is the likelihood that the cache way will be removed from the FIFO replacement list.

The present disclosure avoids the need for feedback paths the FIFO replacement process, so area requirements become smaller in two ways. First of all, the disclosed subject matter requires no storage bit. Secondly, the process is more energy efficient since no need exists to read the storage bit with every cache read. Moreover, there is no need to use the large bus wires in conveying the storage bit information.

With the disclosed subject matter, when a request lookup receives a cache tag miss, one of the set ways must be replaced. The cache way that is selected for replacement is referred to as the victim way since, in certain cases, the cache contents of the victim way must be removed from the cache to make room for the tag-miss allocation. These cases arise when the contents in the cache are, for one reason or another, different from the contents in the DSP 40 main memory. For example, if a store in a line occurs, the contents may change, thereby requiring the need for replacement.

In order to maximize the time each way remains in the cache, the victim way is placed on the tail of a set-based FIFO listing following a cache miss. The depth of the replacement FIFO listing is equal to the number of ways in the cache set, thereby maximizing the time or residency of miss allocation before the same-way is evicted again. Subsequent tag-misses to the same set will likewise generate a victim-way and be placed on the tail of the set FIFO. Each new victim forces earlier victims towards the replacement FIFO listing head. When the number of same-set victims equal the number of cache ways, a victim way is reused on the next tag-miss.

The implementation of the FIFO replacement policy as herein disclosed satisfies two rules. First, the implementation must maximize cache residency based on the number of ways in each set. This is accomplished by placing a victim way on the set FIFO listing only if the tag-miss results in an allocation. If an outstanding allocation request already exists for an earlier tag-miss, the current tag-miss does not update the FIFO listing. The second rule that must be enforced by any implementation concerns cache coherency.

In the instance when a victim way is placed on the FIFO listing tail, it is possible that the same way will reach the head and be reused before the initial allocation completes. This hazard may lead to incoherency between the tag and data caches if the victim way reuse is not corrected. Several possible solutions to this hazard exist including stalling or replaying the reuse request or reading the FIFO listing head a second time after the reuse way is placed on the FIFO listing tail.

In a processing environment using software applications that are highly latency intolerant, the disclosed subject matter reduces processing time and avoids tracking storage bit locations. Such processing environments may include those presenting streaming video and data applications, as well as those wherein immediate tone feedback, e.g., the playing of data from a .wav file table, upon depressing a wireless handset keypad.

In another example of streaming video, a flow of 20+ image frames per second may be appearing on the wireless handset screen. In the image frames, part of the flowing frames contains useful information, while other parts of the frame contain redundant information. The ability to and timing considerations for determining whether the information is redundant or new information can be important to the efficient use of processing resources.

Figure 5:
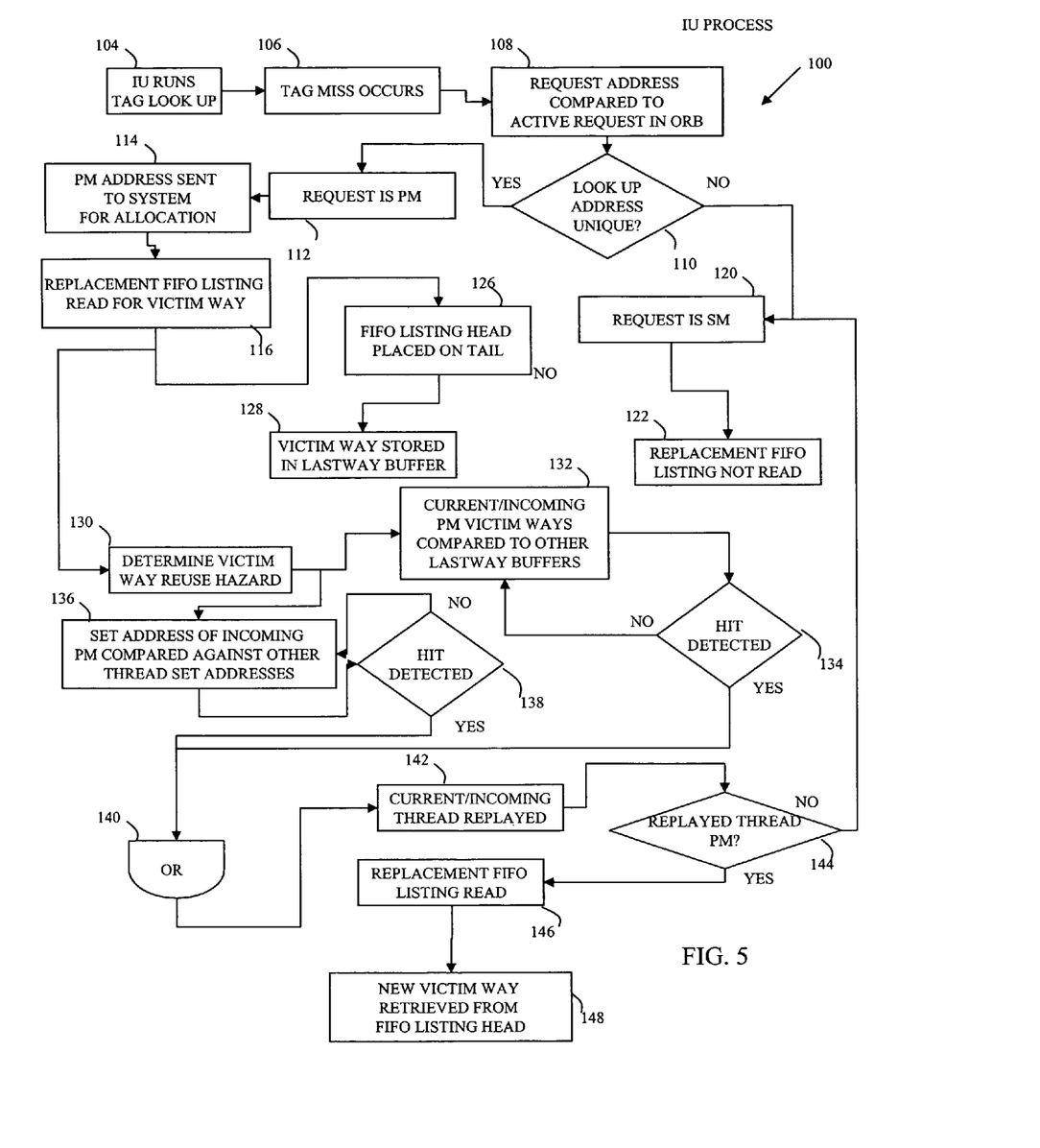
FIG. 5 details one implementation of a flowchart for teaching the use of the present disclosure in an instruction unit (IU), such as presented in FIG. 3.

With this introduction, two implementations will be described in FIGS. 5 and 6. These implementations may be used in a digital signal processor, such as DSP 40 in IU 42 process 100 of FIG. 5 and DU 68 process 102 of FIG. 6. First, therefore, consider IU 42 process 100, wherein IU 42 runs a tag lookup (step 104) and a tag-miss may occur (step 106). In such case, the request address is compared (step 108) to the active requests stored in an outstanding request buffer (ORB). If the lookup address is unique (step 110), the request is considered a primary miss (PM) (step 112). The PM address is sent to system memory for allocation (step 114) and the replacement FIFO listing is read for a victim way (step 116). If the victim way is already in use for this set address, the address was previously sent to system memory by a previous request (step 118), the request is considered a secondary miss (SM) (step 120). In this case, the replacement FIFO listing is not read and cache residency is maximized (step 122).

From query 110, the YES path goes to step 112, where it is determined that the request is a PM or primary miss. If the request is a primary miss, then the victim way is stored in FIFO buffer for allocation at step 114. Then, at step 116, the FIFO listing is read for the next victim way. From step 116, process flow 100 goes to both steps 126 and 130. At step 126, the FIFO listing head is placed at the listing tail and, at step 128, the victim way is stored in the lastway buffer. At step 130, process flow 100 determines the presence of a victim way reuse hazard. This includes comparing the current/incoming victim way to other lastway buffers (step 132). If both the victim way matches and a set address matches, then a reuse hazard exists. This means that the cache replacement algorithm is attempting to use a cache way which is already allocated. Also, the process (step 136) compares the set address of the incoming PM to the other thread set addresses. If a hit is detected at query 134 in response to step 132 or at step 138 in response to step 136, then process flow continues to OR step 140. OR step 140 provides input to step 142 where the current/incoming thread is replayed. If the replayed thread is a PM, then process flow 100 continues to step 146. Otherwise, process flow 100 determines (step 120) that the request is a secondary miss (SM). Process flow 100 reads the FIFO listing (step 146) so that, (step 148) a new victim way is retrieved from the FIFO listing head.

When a reuse hazard exists, therefore, process flow 100 replays the current thread. The next time around it will come back and it will miss again. Process flow 100 will then have determined that the current way that the FIFO is pointing to is already being used. If process flow 100 returns the same way again, then a reuse hazard exists. When the process provides the same way again from the FIFO listing, the outstanding requests will determine that the returned way is already being referred and the thread will be replayed. The thread will come back and it will replay again. The FIFO listing, therefore, provides whatever it gave in the last cycle incremented by one. The same process until there is a victim way that does not demonstrate a reuse hazard. The first victim way not demonstrating a reuse hazard will be the way that process flow 100 uses.

By pipelining the replacement FIFO listing access behind the determination for a victim way allocation, IU 42 can immediately move the victim way from the head to the tail of the FIFO listing in the same clock. This allows IU 42 to support back-to-back multi-thread accesses in the replacement FIFO listing without replays.

If the set address and victim way hit and both are PM requests (step 140), the younger or incoming thread is replayed (step 142). When the thread is replayed and is again determined to be a PM (step 144), the replacement FIFO listing is read (step 146) and the new victim way is retrieved from the head (step 148).

IU implements the replacement FIFO listing as a simple 4-bit counter. Each PM reads the replacement set-counter and increments the set-counter by one. The set-counter is always incremented on a PM, clearing the reuse hazard before the thread that hit the hazard is replayed.

Figure 6:
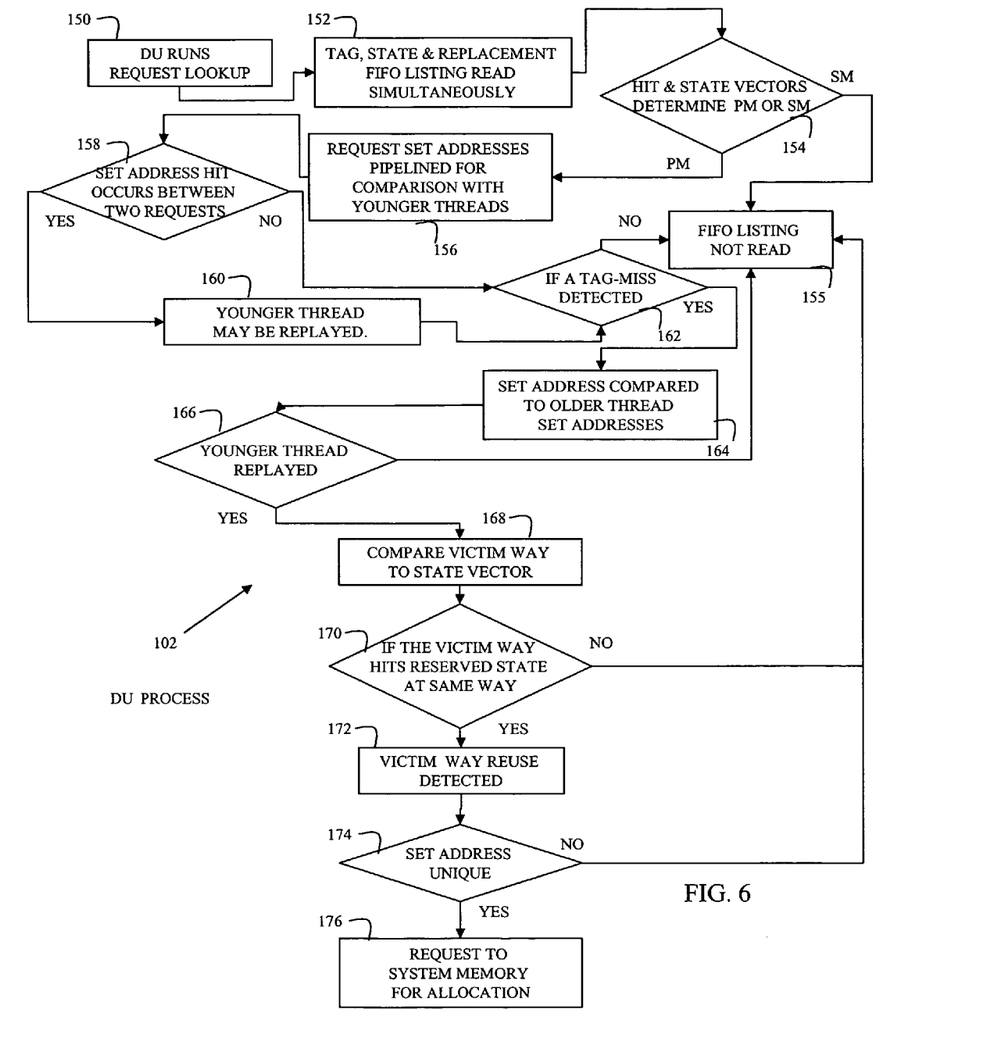
FIG. 6 details an implementation of a flowchart for another use of the presently disclosed subject matter in a data unit (DU) as illustrated in FIG. 3.

FIG. 6 details steps in the DU process 102 of the present disclosure as applied to DU 68. When DU 68 runs a request lookup (step 150), the tag, state and replacement FIFO listing are read simultaneously (step 152). The hit and state vectors are used to determine primary or secondary miss (step 154). Since there is a delay between state/FIFO listing read and state/FIFO listing write, the request set addresses are pipelined for comparison with younger threads (step 156). If a set address hit occurs between two requests (step 158), the younger thread may be replayed (step 160). Therefore, if a tag-miss is detected (step 162), i.e., the state is not reserved, the set address is compared to older thread set addresses (step 164), to determine if the younger/incoming thread must be replayed (step 166). Otherwise, the FIFO listing is not read. To detect the victim way reuse hazard, DU compares the victim way (i.e., the way at the FIFO listing head) to the state vector (step 168). If the victim way hits a reserved state at the same way (step 170), a previous request took the cache way to reserved and the victim way reuse is detected (step 170). Otherwise, the FIFO listing is not read. If the set address is unique and there is no victim way reuse hazard (step 174), the request is a true PM and is sent to system memory for allocation (step 176). Otherwise, the FIFO listing is not read.

With the present embodiment, DU 68 may update the replacement FIFO listing and maintain maximum cache residency and cache coherency. Other implementation, however, may not support back-to-back multi-thread accesses in the replacement FIFO listing, as described above. Such may, occur, where the addition of state and replacement bypass serves to maintain accurate state and FIFO listing information until they are written back to their set.

DU 68, as does IU 42, also implements the replacement FIFO listing as a simple 4-bit counter. Each lookup reads the replacement set-counter and then determines if the request is a PM. Following the determination of PM, the replacement count is incremented by one and written back to the set-counter along with the updated state information. The set-counter will be incremented on a reuse hazard. When the victim way reuse thread is replayed, the new count will be retrieved on the lookup and the hazard will be cleared.

The disclosed subject matter, therefore, provides a method for replacing one of a plurality of set ways of a cache set in the event of a cache tag miss. The disclosure includes the step of selecting a victim way as the cache way that is to be replaced by placing the victim way on the tail of a cache set FIFO listing following the cache miss, wherein the depth of the FIFO approximately equals the number of ways in the cache set. Next, the process places at the end of the cache set FIFO listing subsequent cache tag misses to the cache set. The process then involves reusing a victim way on a next cache tag miss in the event that the number of victim ways for the cache set equals the number of cache set ways. Reuse of a victim way is prevented until initial allocation of the victim way completes. This avoids incoherency between the cache tag and the cache set. Moreover, the process prevents reuse of a victim way until initial allocation of the victim way completes by stalling a reuse request until such initial allocation of the victim way completes. The process also prevents reuse of a victim way until initial allocation of the victim way completes by replaying a reuse request until such initial allocation of the victim way completes. By performing this process, and ones substantially similar to it, the disclosed subject provides for an efficient cache way replacement policy, together with the implementing circuitry, that avoids the existing limitations of the known LRU and NRU algorithms.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for replacing one of a plurality of set ways of a cache set in the event of a cache tag miss, comprising the steps of:
   selecting a victim way as the cache way that is to be replaced according to the position of said cache way on a FIFO listing of cache ways for use in the operation of a digital signal processor;
   placing at the end of said cache set FIFO listing subsequent cache tag misses to said cache set reusing a victim way on a next cache tag miss;
   preventing reuse of a victim way until initial allocation of said victim way avoids incoherency between the cache tag and said cache set;
   preventing reuse of a victim way until initial allocation of said victim way completes by stalling response to a reuse request until such initial allocation of said victim way completes;
   preventing reuse of a victim way until initial allocation of said victim way completes by replaying a reuse request until such initial allocation of said victim way completes.

2. The method of claim 1, wherein said selecting step further comprises the step of selecting a victim way as the cache way that is to be replaced by placing said victim way on the tail of a cache set FIFO listing following said cache miss and wherein the depth of said FIFO approximately equals the number of ways in said cache set.

3. The method of claim 1, further comprising the step of replacing one of a plurality of set ways of a cache set in the event of a cache tag miss in association with the execution of digital signal processor data unit instructions.

4. The method of claim 1, further comprising the step of replacing one of a plurality of set ways of a cache set in the event of a cache tag miss in association with the execution of digital signal processor instruction unit instructions.

5. The method of claim 4, in the event of a victim way reuse hazard, further comprising the steps of:
   comparing a current/incoming primary miss victim way to other ways in said FIFO listing;
   comparing the set address of the incoming primary miss against other set addresses; and
   in response to said comparing steps, replaying the current/incoming thread until a victim way arises that is free from a reuse hazard.

6. The method of claim 1, further comprising the step of adding the most recently used victim way to the tail of said FIFO listing.

7. The method of claim 1, further comprising the step of replacing said victim way in a multi-threaded digital signal processor.

8. The method of claim 1, further comprising the step of performing said replacement steps without requiring use of a storage bit for recording used victim ways.

9. The method for claim 1, further comprising the step of only incrementing said FIFO listing in the event of a cache way miss.

10. A cache way replacement circuit for operation in association with a digital signal processor, said cache way replacement circuit for replacing one of a plurality of set ways of a cache set in the event of a cache tag miss and comprising:
    victim way selection circuitry for selecting a victim way as the cache way that is to be replaced according to the position of said cache way on a FIFO listing of cache ways for use in the operation of the digital signal processor;
    FIFO listing populating circuitry for placing at the end of said cache set FIFO listing subsequent cache tag misses to said cache set reusing a victim way on a next cache tag miss;
    cache way reuse hazard detection circuitry for preventing reuse of a victim way until initial allocation of said victim way avoids incoherency between the cache tag and said cache set, said cache way reuse hazard detection circuitry further for preventing reuse of a victim way until initial allocation of said victim way completes by stalling response to a reuse request until such initial allocation of said victim way completes and preventing reuse of a victim way until initial allocation of said victim way completes by replaying a reuse request until such initial allocation of said victim way completes.

11. The cache way replacement circuit of claim 10, further comprising victim way selection circuitry for selecting a victim way as the cache way that is to be replaced by placing said victim way on the tail of a cache set FIFO listing following said cache miss and wherein the depth of said FIFO approximately equals the number of ways in said cache set.

12. The cache way replacement circuit of claim 10, further comprising data unit circuitry for replacing one of a plurality of set ways of a cache set in the event of a cache tag miss in association with the execution of digital signal processor data unit instructions.

13. The cache way replacement circuit of claim 10, further comprising instruction unit circuitry for replacing one of a plurality of set ways of a cache set in the event of a cache tag miss in association with the execution of digital signal processor instruction unit instructions.

14. The cache way replacement circuit of claim 10, further comprising:
    comparison circuitry for comparing a current/incoming primary miss victim way to other ways in said FIFO listing and comparing the set address of the incoming primary miss against other set addresses; and cache way replaying circuitry for replaying the current/incoming thread in response to said comparing steps until a victim way arises that is free from a reuse hazard.

15. The cache way replacement circuit of claim 10, further comprising FIFO listing circuitry for adding the most recently used victim way to the tail of said FIFO listing.

16. The cache way replacement circuit of claim 10, further comprising multi-threaded digital signal processing circuitry replacing said victim way in a multi-threaded digital signal processor.

17. The cache way replacement circuit of claim 10, further comprising replacement circuitry permitting the performance of said replacement steps without requiring use of a storage bit for recording used victim ways.

18. The cache way replacement circuit of claim 10, further comprising incrementing circuitry for only incrementing said FIFO listing in the event of a cache way miss.

19. A digital signal processor including means for replacing one of a plurality of set ways of a cache set in the event of a cache tag miss, the digital signal processor comprising:

means for selecting a victim way as the cache way that is to be replaced according to the position of said cache way on a FIFO listing of cache ways for use in the operation of the digital signal processor;

means for placing at the end of said cache set FIFO listing subsequent cache tag misses to said cache set reusing a victim way on a next cache tag miss;

means for preventing reuse of a victim way until initial allocation of said victim way avoids incoherency between the cache tag and said cache set;

means for preventing reuse of a victim way until initial allocation of said victim way completes by stalling response to a reuse request until such initial allocation of said victim way completes; and means for preventing reuse of a victim way until initial allocation of said victim way completes by replaying a reuse request until such initial allocation of said victim way completes.

20. The digital signal processor of claim 19, further comprising means for selecting a victim way as the cache way that is to be replaced by placing said victim way on the tail of a cache set FIFO listing following said cache miss and wherein the depth of said FIFO approximately equals the number of ways in said cache set.

21. The digital signal processor of claim 19, further comprising means for replacing one of a plurality of set ways of a cache set in the event of a cache tag miss in association with the execution of digital signal processor data unit instructions.

22. The digital signal processor of claim 19, further comprising means for replacing one of a plurality of set ways of a cache set in the event of a cache tag miss in association with the execution of digital signal processor instruction unit instructions.

23. The digital signal processor of claim 22, further comprising:

means for comparing a current/incoming primary miss victim way to other ways in said FIFO listing;

means for comparing the set address of the incoming primary miss against other set addresses; and means for replaying the current/incoming thread in response to said comparing steps until a victim way arises that is free from a reuse hazard.

24. The digital signal processor of claim 19, further comprising means for adding the most recently used victim way to the tail of said FIFO listing.

25. The digital signal processor of claim 19, further comprising means for replacing said victim way in a multi-threaded digital signal processor.

26. The digital signal processor of claim 19, further comprising means for performing said replacement steps without requiring use of a storage bit for recording used victim ways.

27. The digital signal processor of claim 19, further comprising means for only incrementing said FIFO listing in the event of a cache way miss.

28. A computer usable storage medium having computer readable program code means embodied therein for processing instructions on a digital signal processor for replacing one of a plurality of set ways of a cache set in the event of a cache tag miss, said computer usable storage medium comprising:

computer readable program code means for selecting a victim way as the cache way that is to be replaced according to the position of said cache way on a FIFO listing of cache ways for use in the operation of the digital signal processor;

computer readable program code means for placing at the end of said cache set FIFO listing subsequent cache tag misses to said cache set reusing a victim way on a next cache tag miss;

computer readable program code means for preventing reuse of a victim way until initial allocation of said victim way avoids incoherency between the cache tag and said cache set;

computer readable program code means for preventing reuse of a victim way until initial allocation of said victim way completes by stalling response to a reuse request until such initial allocation of said victim way completes;

computer readable program code means for preventing reuse of a victim way until initial allocation of said victim way completes by replaying a reuse request until such initial allocation of said victim way completes.

29. The computer usable storage medium of claim 28, further comprising computer readable program code means for selecting a victim way as the cache way that is to be replaced by placing said victim way on the tail of a cache set FIFO listing following said cache miss and wherein the depth of said FIFO approximately equals the number of ways in said cache set.

* * * * *

UNITED STATES PATENT AND TRADEMARK OFFICE
CERTIFICATE OF CORRECTION

| | | |
|---|---|---|
| PATENT NO. | : 7,673,102 B2 | Page 1 of 1 |
| APPLICATION NO. | : 11/437501 | |
| DATED | : March 2, 2010 | |
| INVENTOR(S) | : Ahmed et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Twenty-second Day of February, 2011

David J. Kappos
*Director of the United States Patent and Trademark Office*